(12) United States Patent
Liberty et al.

(10) Patent No.: US 7,251,748 B2
(45) Date of Patent: Jul. 31, 2007

(54) SYSTEM AND METHOD FOR DETERMINING A GLOBAL ORDERING OF EVENTS USING TIMESTAMPS

(75) Inventors: Dean A. Liberty, Nashua, NH (US); Andrew E. Phelps, Encinitas, CA (US); David L. Isaman, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 591 days.

(21) Appl. No.: 10/661,654

(22) Filed: Sep. 12, 2003

(65) Prior Publication Data

US 2005/0060619 A1    Mar. 17, 2005

(51) Int. Cl.
*G06F 11/00* (2006.01)

(52) U.S. Cl. .................. 714/20; 713/500; 709/248; 707/201

(58) Field of Classification Search ............... None
See application file for complete search history.

(56) References Cited

U.S. PATENT DOCUMENTS

| | | | | |
|---|---|---|---|---|
| 4,742,511 A | * | 5/1988 | Johnson ................ 370/406 |
| 4,852,095 A | * | 7/1989 | Meltzer ................ 714/737 |
| 5,471,631 A | * | 11/1995 | Beardsley et al. ......... 713/502 |
| 5,682,551 A | * | 10/1997 | Pawlowski et al. .......... 710/36 |
| 5,729,397 A | | 3/1998 | Ottesen et al. |
| 5,774,647 A | | 6/1998 | Raynham et al. |
| 5,774,716 A | * | 6/1998 | Harbinski et al. .......... 707/202 |
| 5,896,524 A | * | 4/1999 | Halstead et al. ............ 713/375 |
| 5,964,846 A | * | 10/1999 | Berry et al. ................ 713/375 |
| 6,038,690 A | | 3/2000 | Jacobson et al. |
| 6,042,477 A | * | 3/2000 | Addink ...................... 463/42 |
| 6,173,418 B1 | * | 1/2001 | Fujino et al. ................ 714/20 |
| 6,334,191 B1 | * | 12/2001 | Fisher et al. ............... 713/502 |
| 6,718,476 B1 | * | 4/2004 | Shima ....................... 713/400 |
| 7,072,912 B1 | * | 7/2006 | Verma et al. .............. 707/202 |
| 7,188,052 B2 | * | 3/2007 | Levine et al. .............. 702/187 |
| 2002/0143998 A1 | * | 10/2002 | Rajagopal et al. .......... 709/248 |
| 2005/0228898 A1 | * | 10/2005 | Evans ....................... 709/231 |

OTHER PUBLICATIONS

Merging of TRACE Data from Distributed Systems IBM Technical Disclosure Bulletin NA9112165 vol. 34 Issue 7A pp. 165-166, Published Dec. 1, 1991.*

* cited by examiner

*Primary Examiner*—Scott Baderman
*Assistant Examiner*—Joseph Schell
(74) *Attorney, Agent, or Firm*—Meyertons Hood Kivlin Kowert & Goetzel, P.C.; B. Noël Kivlin

(57) ABSTRACT

A method of utilizing timestamps for the global ordering of event information, particularly hardware error reporting, is disclosed. Locally generated time stamps are associated with hardware errors or other events. The timestamps form the basis for the global ordering of event information. The timestamps are normalized, either through a pre-synchronization process with a common time, or through the use of offsets maintained either locally near system chips or by the system processor. Once normalized, the timestamps can be compared to determine a first occurring event among multiple reported events.

16 Claims, 5 Drawing Sheets

SYSTEM AND METHOD FOR DETERMINING A GLOBAL ORDERING OF EVENTS USING TIMESTAMPS

FIELD OF THE INVENTION

The illustrative embodiment of the present invention relates generally to the use of hardware timestamps and more particularly to the use of hardware timestamps to determine a global ordering of events.

BACKGROUND

Some computer systems have many chips working under the control of one or more processors. Hardware problems or faults suffered by the chips and/or observed by the chips and reported to the processors often manifest themselves almost simultaneously. An initial hardware fault may trigger multiple error reports which are transmitted to the system processor. The multiplicity of these reports from a single triggering event may make diagnosis of the problem causing the initial error difficult in that it is often problematic to reconstruct which error occurred first among multiple reported errors.

Determining the time of the occurrence of the errors is difficult since chips working under the control of one or more processors frequently have local time counters which are not synchronized. The local time counters may increment with every clock tick (e.g. every 16 nanoseconds or however fast the clock is in the electronic device). Even when two local chips are both using counters that increment on the clock tick however, the values of the local time counters may be different since they may have started from a different baseline. Since the chips each have their local time counters operating independently, comparison of the different local time counters for the purposes of identifying the first event in a string of events is frequently quite difficult. Furthermore, propagation times of errors from the chips to the operating system may not be uniform for all chips, resulting in inaccurate assignment of error times to errors.

Conventionally, computer systems have generated hardware faults and reported them to controlling processors. The controlling processor can accumulate the reports of hardware errors and present them to a human user. Unfortunately without some way of determining which error occurred first, the diagnosis of the initial cause of the fault is exceedingly difficult.

SUMMARY OF THE INVENTION

The illustrative embodiment of the present invention provides a way of managing multiple timestamps generated from local time counters associated with chips. By normalizing the time stamps generated upon the occurrence of an event such as a hardware fault, software logic run by the processor can easily determine the order of the global event. Specifically, the originating event that is the first event in a series of cause and effect events may be determined. The illustrative embodiment of the present invention includes a number of different implementations through which to manage timestamps by the local time counters associated with the chips. In one implementation, the difference or offset between a Time Base (a baseline time value) selected by the system processor and each of the local time counters is determined. The offset value is recorded in a location accessible to the system processor. Upon receiving error reports with associated time stamps from local time counters, the timestamps are normalized using the offset for the particular recording time counter. The normalized time values are then compared to determine which event occurred first.

In another implementation, the offsets of each local time counter are again determined by comparing them against the Time Base. In this implementation however, the offsets are stored locally with the chip. Upon the occurrence of an error, the error is reported along with the time stamp generated by the local time counter as before, except in this case the time stamp is normalized using the offset prior to being reported to the processor.

In an additional implementation providing management of time stamps, the Time Base is used to generate a common time. The common time is distributed to all the chips controlled by the processor. The time counters associated with each chip are all reset simultaneously to reflect the Time Base. Accordingly, any error report will then have a common time basis.

In one embodiment, an isochronous electronic device includes at least one processor and multiple chips. Each chip is associated with a local time counter. Errors associated with one of the chips are detected. The local time counter associated with the chip generates a timestamp at the time of the occurrence of the detected error. The error and a normalized form of the timestamp are compared by the processor with other detected errors and the normalized forms of their associated timestamps in order to determine the sequence of errors.

In another embodiment, an electronic device includes at least one processor and multiple chips. The chips are each associated with a local time counter. An offset is determined between the Time Base and the time indicated by each of the local time counters which are associated with the chips. Each offset is recorded at a location accessible to the processor. A timestamp is generated by the local time counters at the time of the occurrence of detected errors. The error and the timestamp are reported to the processor which uses the recorded offset to normalize the timestamp for the reported error and compare it with other normalized timestamps associated with other errors in order to determine an order of occurrence of the errors.

In another embodiment, an electronic device is part of a system for determining a global ordering of events. The system includes at least one processor having access to a selected Time Base. Also included in the system are a number of chips with each chip associated with a local time counter. Also included in the system is an electronic storage location accessible to the processor. The storage location holds data structures holding programmatically determined offsets between the time indicated by the Time Base and the time indicated by each of the local time counters associated with the multiple chips. The offsets are applied to normalize reported hardware errors from at least one of the chips and the associated timestamp generated by the local time counter. The normalization process helps to determine the order of occurrence of the hardware errors in the electronic device.

DETAILED DESCRIPTION

The illustrative embodiment of the present invention provides a method of utilizing timestamps for the global ordering of event information, particularly hardware error reporting. Locally generated time stamps are associated with hardware errors or other events. The timestamps form the basis for the global ordering of event information. The timestamps are normalized, either through a pre-synchronization process with a common time, or through the use of offsets maintained either locally near system chips or by the system processor. Once normalized, the timestamps can be compared to determine a first occurring event among multiple reported events.

A computer system may have many free running time counters driven by the same clock. In an isochronous electronic device, the time counters are all running at the same frequency. In isochronous systems data must be delivered within certain time constraints. Isochronous systems are not as rigid as synchronous systems in which data can only be delivered at specified intervals, nor as lenient as asynchronous systems in which data may be delivered in streams broken by random intervals. The free running time counters are often associated with chips which are controlled by a system processor. The illustrative embodiment of the present invention allows timestamps generated by the time counters to be normalized so that timestamps may be compared. A timestamp is a record of the time indicated by the time counter at the occurrence of a particular event.

Figure 1:
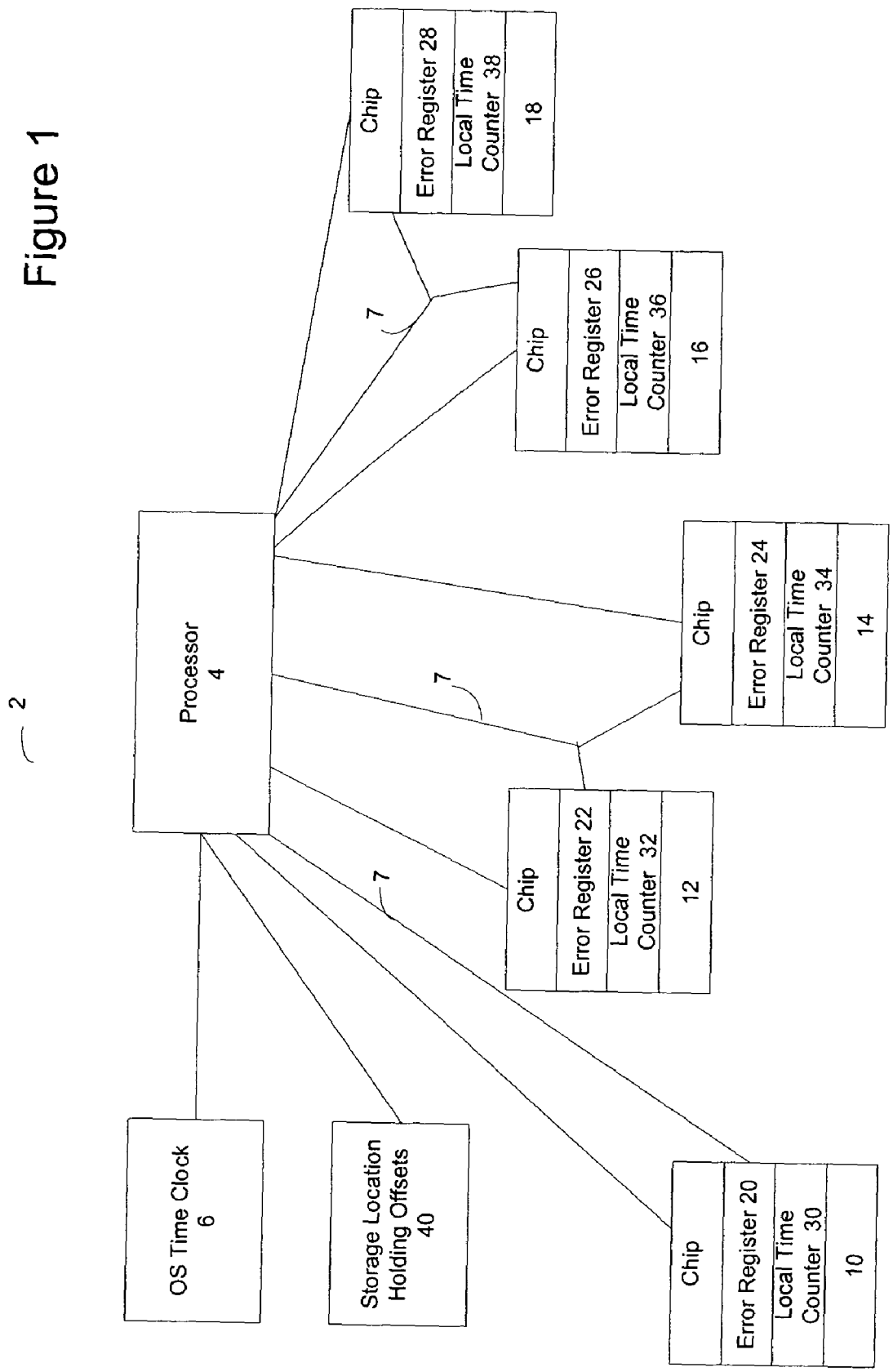
FIG. 1 depicts an environment suitable for practicing the illustrative embodiment of the present invention.

FIG. 1 depicts a block diagram of an environment suitable for practicing the illustrative embodiment of the present invention. An electronic device 2 such as a server or mainframe includes a system processor 4. The processor 4 also has access to an operating system clock 6 maintained by the operating system. Also included in the electronic device 2 are a plurality of chips such as ASIC chips 10, 12, 14, 16, and 18. Each of the chips, 10, 12, 14, 16, and 18 include an error register 20, 22, 24, 26, 28 and a local time counter 30, 32, 34, 36, 38. The local time counters 30, 32, 34, 36, and 38 are incremented with every clock tick in the electronic device 2. The local time counter increments may be very small time periods such as every 16 nanoseconds. In contrast the operating system time clock 6 typically displays the time in second or minute intervals to a user. The processor 4 may determine the offset in time between the time indicated by a selected Time Base (a baseline reference time) and the local time counters 30, 32, 34, 36, and 38. Any offsets so determined are stored in a storage location 40 which is accessible to the processor 4.

The electronic device 2 also includes a servicebus 7, a separate network for communication between the controlling processor 4 and the chips 10, 12, 14, 16 and 18. The servicebus 7 is used by the processor to read and write the status and control various parts of the system in order to configure and diagnose the system. The servicebus 7 is used to read two or more targets simultaneously and to subsequently retrieve sets of data from the targets. The servicebus 7 is used by the processor 4 (as discussed further below) to transmit reset signals and retrieve timestamps from the chips 10, 12, 14, 16 and 18.

Figure 2:
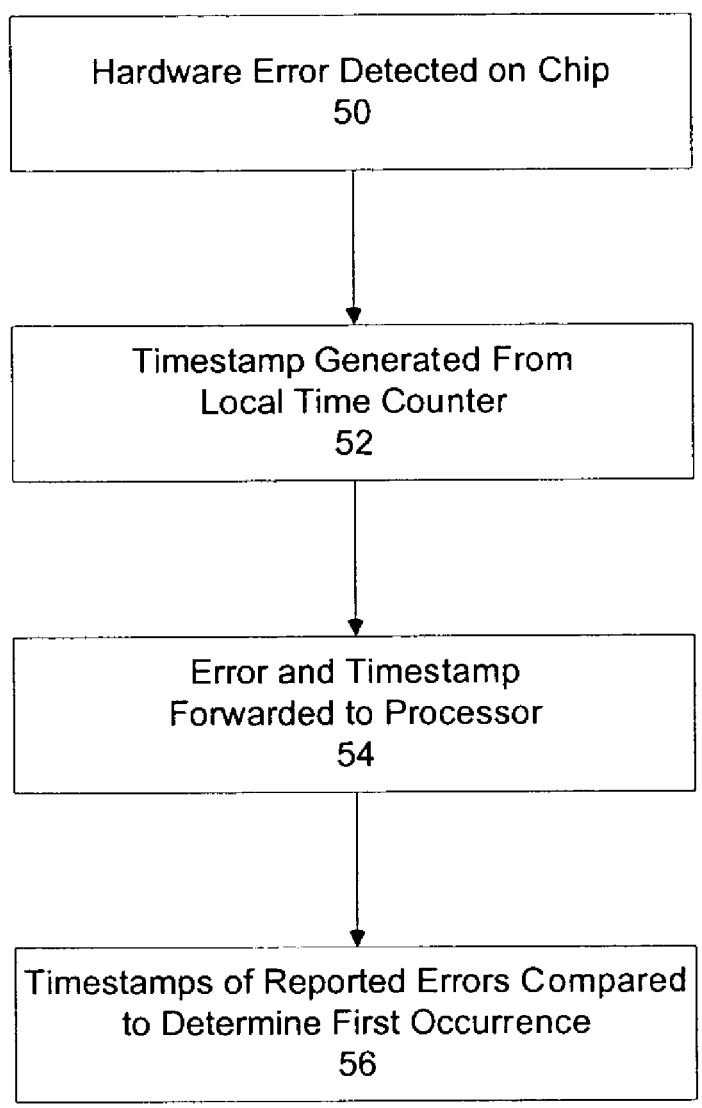
FIG. 2 depicts a flow chart of the overall sequence of steps followed by the illustrative embodiment of the present invention to determine a global ordering of reported events.

Since the values in the local time counters 30, 32, 34, 36 and 38 may be non-synchronized with regard to each other, they must be normalized to a common frame of reference before they can be compared. The illustrative embodiment of the present invention includes a number of different implementations which may be used to normalize the timestamps to determine a global ordering of events. FIG. 2 depicts a flow chart of the overall sequence of steps followed by the present invention to use normalized time stamps to determine an overall global ordering of event information. The sequence begins when hardware errors are detected on at least one of the chips 10, 12, 14, 16, and 18 (step 50). The local time counter 30, 32, 34, 36, 38 that is associated with the chips 10, 12, 14, 16, and 18 is used to generate a time stamp at the time that error is detected (step 52). The time stamp is the value of the local time counter at the time of the detected event/error. The error(s) and time stamp(s) are forwarded to the processor (step 54). Depending upon which implementation of the present invention is being used, the timestamp may be normalized prior to being forwarded to the processor. Alternatively, the timestamp may be normalized upon arriving at a processor 4. Once the timestamps have been normalized (the normalization process of the timestamps is discussed in further detail below), timestamps associated with different errors are compared in order to determine which error or event occurred prior to other reported errors or events (step 56).

Figure 3:
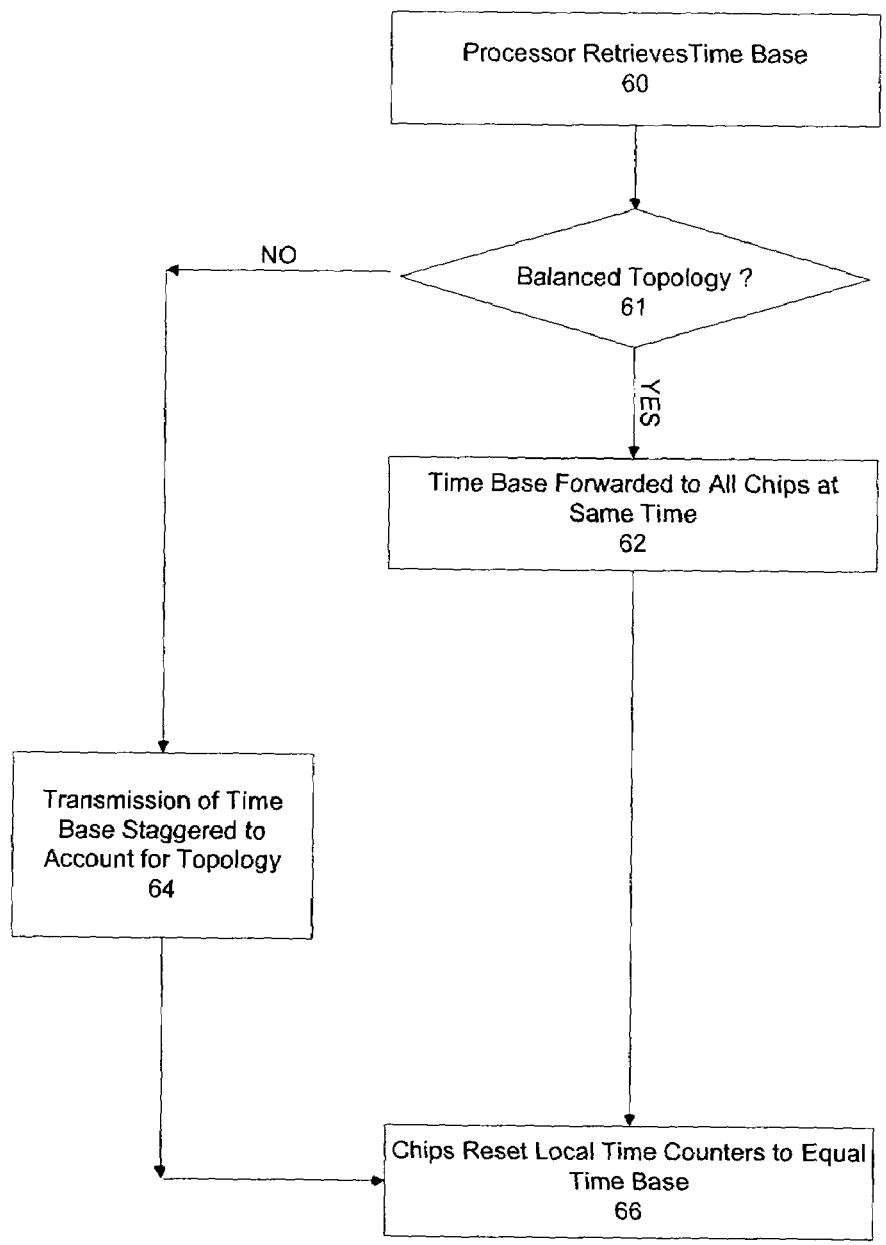
FIG. 3 depicts the sequence of the steps followed by the illustrative embodiment of the present invention to reset multiple chips to synchronize with a Time Base.

One method of normalizing the time stamps for the free running time counter is to instruct the local time counters 30, 32, 34, 36, and 38 to be reset to the same Time Base. The Time Base may be any baseline time value including the time of one of the local time counters. FIG. 3 depicts the sequence of steps followed by the present invention to reset the local time counters 30, 32, 34, 36 and 38 to the selected Time Base. The sequence of steps begins when the processor retrieves the Time Base (step 60). If the topology of the electronic device 2 that is used to transmit the Time Base to the chips is balanced (step 61) so that the transmitted Time Base will arrive at the chips 10, 12, 14, 16, and 18 simultaneously, no special steps must be taken to transmit the Time Base to the chips (step 62). The Time Base may be transmitted using a simultaneous multicast write operation. If however, the network topology is unbalanced (step 61) as is often the case, the processor sends the Time Base to the chips 10, 12, 14, 16, and 18 by staggering the transmission so that the various chips will receive the Time Base simultaneously (step 64). The transmission may be staggered through the use of programmable hardware delays, either in the sender, the receiver or the network, or some combination thereof. Once the chips 10, 12, 14, 16 and 18 receive the Time Base, the chips are reset so that the local time counters are equal to the Time Base (step 66). Since the local time counters are all driven off the same clock pulse, timestamps subsequently generated by the local time counters will be normalized with regard to each other and will therefore make the sequencing of event messages possible. Those skilled in the art will recognize that there may be many sources of the Time Base. For example, the local time counters 30, 32, 34, 36 and 38 may all be reset to zero simultaneously which normalizes the local time counters with respect to each other. Alternatively, the Time Base may be the time of one of the local time counters or any arbitrary value.

The use of a common time for all of the chips, 10, 12, 14, 16, and 18 and their associated local time counters 30, 32, 34, 36, and 38 suffers from a couple of drawbacks which must be taken into account. If the reset process does not go correctly, for one of the chips 10, 12, 14, 16, or 18, the process must be repeated for all of the chips until all of the chips have successfully completed the operation. Additionally, the process is not particularly scalable in that the subsequent addition of chips to the system requires a resetting of all of the chips and not just the new chip. Errors frequently occur with the initial use of a new chip and may accordingly prevent synchronization. Another issue is that a reset of the time counters to values lower than their current values, such as zero, may prevent subsequent timestamps from being monotonically increasing. This makes it difficult or impossible to discern global event ordering. Accordingly, additional implementations to normalize the timestamps are also within the scope of the present invention.

As previously noted during the discussion of FIG. 1, one of the implementations of the present invention involves the use of offsets noting the time differential between the local time counters 30, 32, 34, 36, and 38 and the Time Base. The use of offsets within the present invention is depicted in the flow chart of FIG. 4. The sequence of steps begins when the processor retrieves the selected Time Base and the values for the local time counters 30, 32, 34, 36 and 38 simultaneously (step 70). In order to determine the offset, a simultaneous read of both the Time Base and the local time counter is conducted so that the values may be compared. Those skilled in the art will recognize that it is possible to read either the Time Base or any local time counter whose offset has already been calculated, as long as that offset is included in the calculation of the new local counter's offset. The Time Base is simply a time value whose offset is zero. Once the values have been retrieved, the time differential (offset) between the Time Base and the local time counters is then determined (step 72). The determined offsets are then stored in a location accessible to the processor 4 (step 74). Subsequently, timestamps accompanying errors are reported to the processor 4 from multiple chips 10, 12, 14, 16, and 18 in the system (step 76). The processor 4 uses the storage offset associated with the reporting local time counters to normalize the timestamp associated with the error (step 78). Once the time stamps are normalized, they are compared against each other to determine the first error or event in a sequence (step 80).

Figure 4:
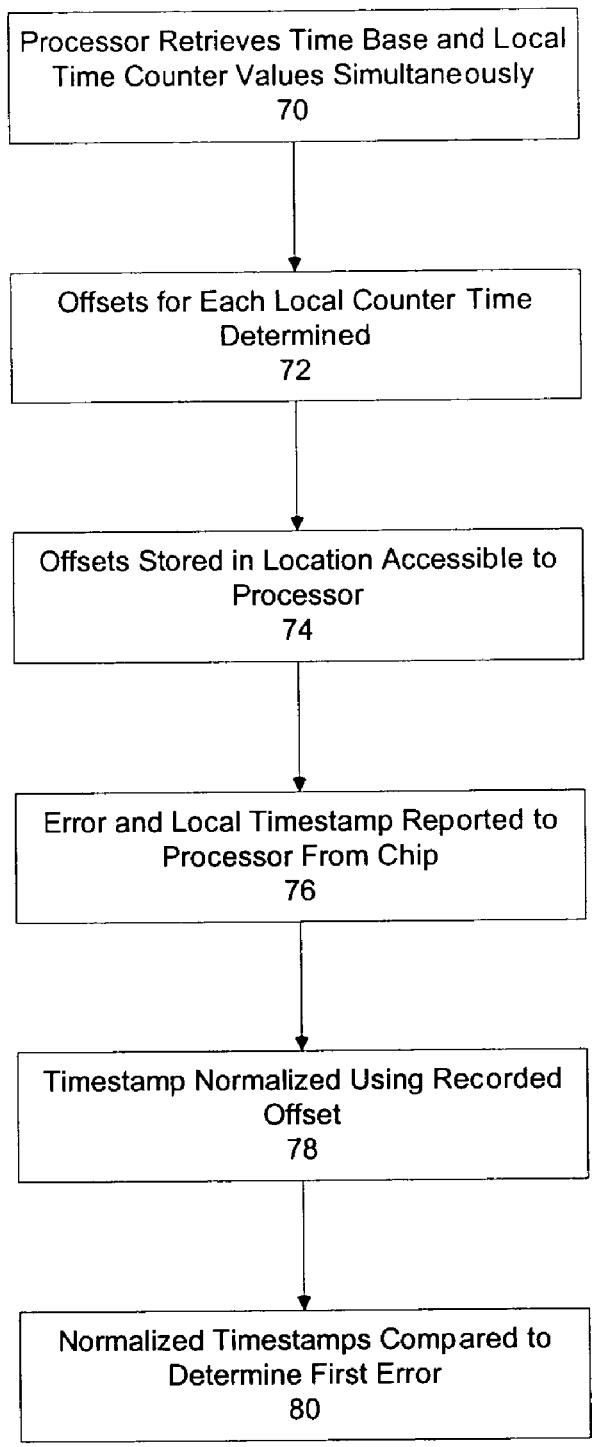
FIG. 4 depicts the sequence of steps followed by the illustrative embodiment of the present invention to determine offsets between the local time counters and the Time Base in order to normalize error timestamps.
Figure 5:
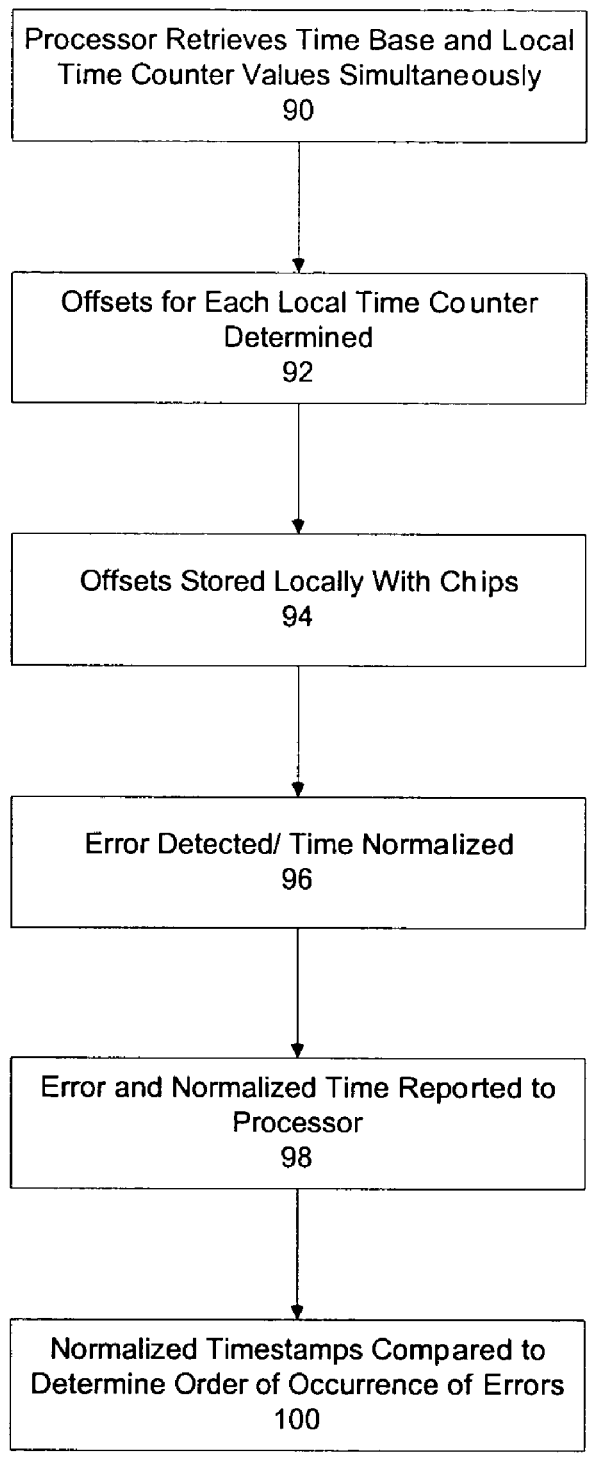
FIG. 5 depicts the sequence of steps followed by the illustrative embodiment of the present invention to determine offsets between the Time Base and local time counters with the offsets being stored locally to normalize the reported timestamps prior to error reporting.

The implementation depicted in FIG. 4 requires the processor to perform a normalization process subsequent to receiving the error or event report from the chips 10, 12, 14, 16, and 18. In another implementation, depicted in the flowchart of FIG. 5, the offsets are stored in a location accessible to the chips 10, 12, 14, 16, and 18 and applied to the timestamps prior to the error being reported. The sequence of steps for this implementation begins when the processor retrieves the selected Time Base value and the values of the local time counters 30, 32, 34, 36, and 38 (step 90). The offsets for each local time counter are then determined by comparing the Time Base with the time indicated by each of the local time counters (step 92). The determined offsets are then sent from the processor 4 to the chips 10, 12, 14, 16, and 18 and stored locally to the chips (step 94). Subsequently, an error is detected by one or more of the local chips 10, 12, 14, 16, and 18, the timestamp is retrieved from the local time counter 30, 32, 34, 36, and 38, and the time is normalized using the locally stored offset (step 96). The error which is stored in the local error register 20, 22, 24, 26, and 28 and the normalized timestamp are then reported to processor (step 98). The normalized timestamps may then be directly compared to each other upon receipt in order to determine the order of occurrence of the reported errors (step 100).

Reported events and errors are not always immediately reviewed by humans. Accordingly, in one implementation of the present invention, normalized hardware timestamps are associated with an operating system time stamp bearing date and hour information. Thus, in the event of errors separated by time which have similar values (due to the local time counter rolling over) it becomes clear that the events are widely separated by time.

Although reference has been made herein to the implementation depicted in FIG. 1, those skilled in the art will realize that a number of different alternative configurations are possible within the scope of the present invention. For example, the electronic device may be a multi-processor computer system (e.g.: a 16 processor, 8 processor or 4 processor configuration). The electronic device may employ more than one primary processor with separate groups of subsidiary processors working at the direction of different primary processors. In such a segmented system, each primary processor may be practicing the present invention independent of the other primary processor(s), such that a partially global order of events is determined for a subset of the total number processors in the electronic device (i.e. those processors under a particular primary processor).

Similarly, although reference has been made to the use of error registers, more generalized event registers may also be used wherein particular bits in the registers are set to indicate the occurrence or non-occurrence of particular events including errors. Other methods of storing indications of events within the electronic device other than the use of registers may also be used without departing from the scope of the present invention. Of similar note, the local time counters may be associated with more than one chip in the system.

Since certain changes may be made without departing from the scope of the present invention, it is intended that all matter contained in the above description or shown in the accompanying drawings be interpreted as illustrative and not in a literal sense. For example, although the figures and description contained herein have made repeated reference to determining the global ordering of error events, the determination of the order of other types of events may also be determined. Similarly, practitioners of the art will realize that the sequence of steps and architectures depicted in the figures may be altered without departing from the scope of the present invention. The illustrations contained herein are singular examples of a multitude of possible depictions of the present invention, and should be considered accordingly.

We claim:

1. In an isochronous electronic device including at least one processor and a plurality of chips, each said chip associated with a local time counter of a plurality of local time counters, a method for determining a global ordering of events, said method comprising:

detecting an event associated with one of said plurality of chips;

generating a timestamp with said local time counter at the time of the occurrence of said detected event, said timestamp being associated with said event;

comparing said event and a normalized form of said timestamp with other events and associated normalized timestamps to determine an order of occurrence;

providing a Time Base selected by said processor, said Time Base being a baseline time value; and transmitting a reset instruction from said processor to said plurality of local time counters associated with said plurality of chips, said plurality of local time counters resetting to a designated time so as to be synchronized with respect to each other;

wherein the transmitting of the reset instruction is staggered so as to ensure that said resetting occurs simultaneously, said transmitting taking into account delays caused by network topology.

2. The method of claim 1 wherein said processor maintains a record of an offset between the reset local time counter time and the Time Base.

3. The method of claim 1 wherein said designated time is the Time Base and said plurality of local time counters are reset so as to indicate the same time as said Time Base.

4. The method of claim 1 wherein said transmitting of said reset instruction is performed using a simultaneous multicast write operation performed by said processor.

5. The method of claim 1, further comprising:

resetting all of said plurality of chips and an additional chip, said resetting being performed to add the additional chip that is synchronized with said plurality of chips.

6. In an electronic device including at least one processor and a plurality of chips, each said chip associated with a local time counter of a plurality of local time counters, a storage medium comprising computer-executable instructions for a method comprising:

detecting an event associated with one of said plurality of chips;

generating a timestamp with said local time counter at the time of the occurrence of said detected event, said timestamp being associated with said event;

comparing said event and a normalized form of said timestamp with other events and associated normalized timestamps to determine an order of occurrence;

providing a Time Base selected by said processor, said Time Base being a baseline time value; and transmitting a reset instruction from said processor to said plurality of local time counters associated with said plurality of chips, said plurality of local time counters resetting to a designated time so as to be synchronized with respect to each other;

wherein the transmitting of the reset instruction is staggered so as to ensure that said resetting occurs simultaneously, said transmitting taking into account delays caused by network topology.

7. The storage medium of claim 6 where said processor maintains a record of an offset between the reset value of the local time counter and the Time Base.

8. The storage medium of claim 6 wherein said designated time is the Time Base and said plurality of local time counters are reset so as to indicate the same time as said Time Base.

9. The storage medium of claim 6 wherein the transmitting of said reset instruction is performed using a simultaneous multicast write operation performed by said processor.

10. The medium of claim 6, wherein said method further comprises:

resetting all of said plurality of chips and an additional chip, said resetting being performed to add the additional chip that is synchronized with said plurality of chips.

11. In an isochronous electronic device including at least one processor and a plurality of chips, each said chip associated with a local time counter of a plurality of local time counters, a method for determining a global ordering of events, said method comprising:

detecting an event associated with one of said plurality of chips;

generating a timestamp with said local time counter at the time of the occurrence of said detected event, said timestamp being associated with said event;

comparing said event and a normalized form of said timestamp with other events and associated normalized timestamps to determine an order of occurrence;

providing a Time Base selected by said processor, said Time Base being a baseline time value;

determining an offset between the time indicated by said Time Base and the time indicated by each of said local time counters associated with said plurality of chips;

transmitting each said offset for a local time counter to the chip with which the local time counter is associated;

recording each offset associated with each said local time counter at a location accessible to the chip associated with the local time counter; and normalizing said timestamp using said offset associated with the local time counter prior to reporting said timestamp and said event to said processor.

12. The method of claim 11 wherein a software timestamp received from an operating system is associated with said reported event and timestamp.

13. The method of claim 12 wherein said software timestamp is used in determining said order of occurrence of events.

14. In an electronic device including at least one processor and a plurality of chips, each said chip associated with a local time counter of a plurality of local time counters, a storage medium comprising computer-executable instructions for a method comprising:

detecting an event associated with one of said plurality of chips;

generating a timestamp with said local time counter at the time of the occurrence of said detected event, said timestamp being associated with said event;

comparing said event and a normalized form of said timestamp with other events and associated normalized timestamps to determine an order of occurrence;

providing a Time Base selected by said processor, said Time Base being a baseline time value;

determining an offset between the time indicated by said Time Base and the time indicated by each of said local time counters associated with said plurality of chips;

transmitting each said offset for a local time counter to the chip with which the local time counter is associated;

recording each offset associated with each said local time counter at a location accessible to the chip associated with the local time counter; and normalizing said timestamp using said offset associated with the local time counter prior to reporting said timestamp and said event to said processor.

15. The storage medium of claim 14 wherein a software timestamp received from the operating system is associated with said reported event and timestamp.

16. The storage medium of claim 15 wherein said software timestamp is used in determining said order of occurrence of events.

* * * * *